(12) United States Patent
Miller et al.

(10) Patent No.: US 9,402,179 B1
(45) Date of Patent: Jul. 26, 2016

(54) INDUCTIVE PICKUP COIL FOR SECURE PAIRING

(71) Applicant: Amazon Technologies, Inc., Reno, NV (US)

(72) Inventors: Matthew Miller, Mountain View, CA (US); Bradley James Bozarth, Sunnyvale, CA (US)

(73) Assignee: Amazon Technologies, Inc., Reno, NV (US)

( * ) Notice: Subject to any disclaimer, the term of this patent is extended or adjusted under 35 U.S.C. 154(b) by 23 days.

(21) Appl. No.: 14/036,950

(22) Filed: Sep. 25, 2013

(51) Int. Cl.
*G06F 7/04* (2006.01)
*H04W 12/06* (2009.01)

(52) U.S. Cl.
CPC .................................. *H04W 12/06* (2013.01)

(58) Field of Classification Search
CPC .................................................. H04W 12/06
USPC ............................................................ 726/7
See application file for complete search history.

(56) References Cited

U.S. PATENT DOCUMENTS

| 2008/0013764 A1* | 1/2008 | Alber et al. ................... 381/315 |
| 2013/0101149 A1* | 4/2013 | Maenpaa ....................... 381/331 |
| 2014/0211973 A1* | 7/2014 | Wang et al. ................... 381/315 |

FOREIGN PATENT DOCUMENTS

WO    2013103922    7/2013

OTHER PUBLICATIONS

Kozma-Spytek, Linda. "Hearing Aid Compatibility for Digital Wireless Phones." Audiology Online. Oct. 9, 2006. 5 pp.
"Wi-Fi Protected Setup." Wikipedia. Aug. 3, 2013. 4 pp.

* cited by examiner

*Primary Examiner* — Mohammad W Reza
(74) *Attorney, Agent, or Firm* — Weaver Austin Villeneuve & Sampson LLP

(57) ABSTRACT

Techniques and systems are provided for facilitating secure pairing of a client device with a remote device using a inductive pickup coil in the client device and an intermediate hearing-aid-compatible (HAC) mobile device. Credentials stored in or accessible to the mobile device may be encoded in an magnetic HAC signal in the audio frequency spectrum and communicated to the client device through inductive coupling with the inductive pickup coil in the client device. The client device may then use the credentials to gain access to the remote device. In some implementations, the mobile device may cease broadcasting the magnetic signal upon receipt of an indication that the client device has gained access to the remote device.

21 Claims, 2 Drawing Sheets

INDUCTIVE PICKUP COIL FOR SECURE PAIRING

BACKGROUND

Due to advances in semiconductor manufacturing techniques, processor and sensor designs, and network communications technologies, there are a large number of consumer devices that may require connection to a remote device, e.g., a router, web server, network storage, etc., in order to properly operate or to realize their full operational potential.

Some of these devices, e.g., computers, tablets, and smartphones, may provide a user with a display screen and a keyboard (real or virtual) that allows the user to easily configure the device for connection, e.g., via an 802.11 wireless connection or similar connection, to a remote device. For example, a user using a smartphone may easily connect the smartphone to a wireless network by selecting the relevant wireless network from an on-screen list of available wireless networks and then entering a security credential, e.g., a password, via the keyboard in an on-screen prompt that is displayed when the smartphone attempts to initially connect to the selected network.

Other devices, however, may have a drastically reduced interface, or virtually no interface at all. For example, network-connectable printers may have a one- or two-line display and only one or two buttons. Smart appliances may, for example, have the ability to connect to the Internet to communicate device health status to a central customer support center, to retrieve weather information to allow for more efficient temperature control of a home, or to allow for voice-over-internet-protocol (VoIP) communications, but may have little or no user interface. In order for such devices to be connected to a remote device via a network connection, a user of such a device must either be comfortable communicating with the device using a remote interface (which requires some degree of technical skill and may be daunting to many users) or must use, if present, whatever user interface is provided—which may be confusing and time-consuming since there may be a limited number of input and output options available on the device.

BRIEF DESCRIPTION OF DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
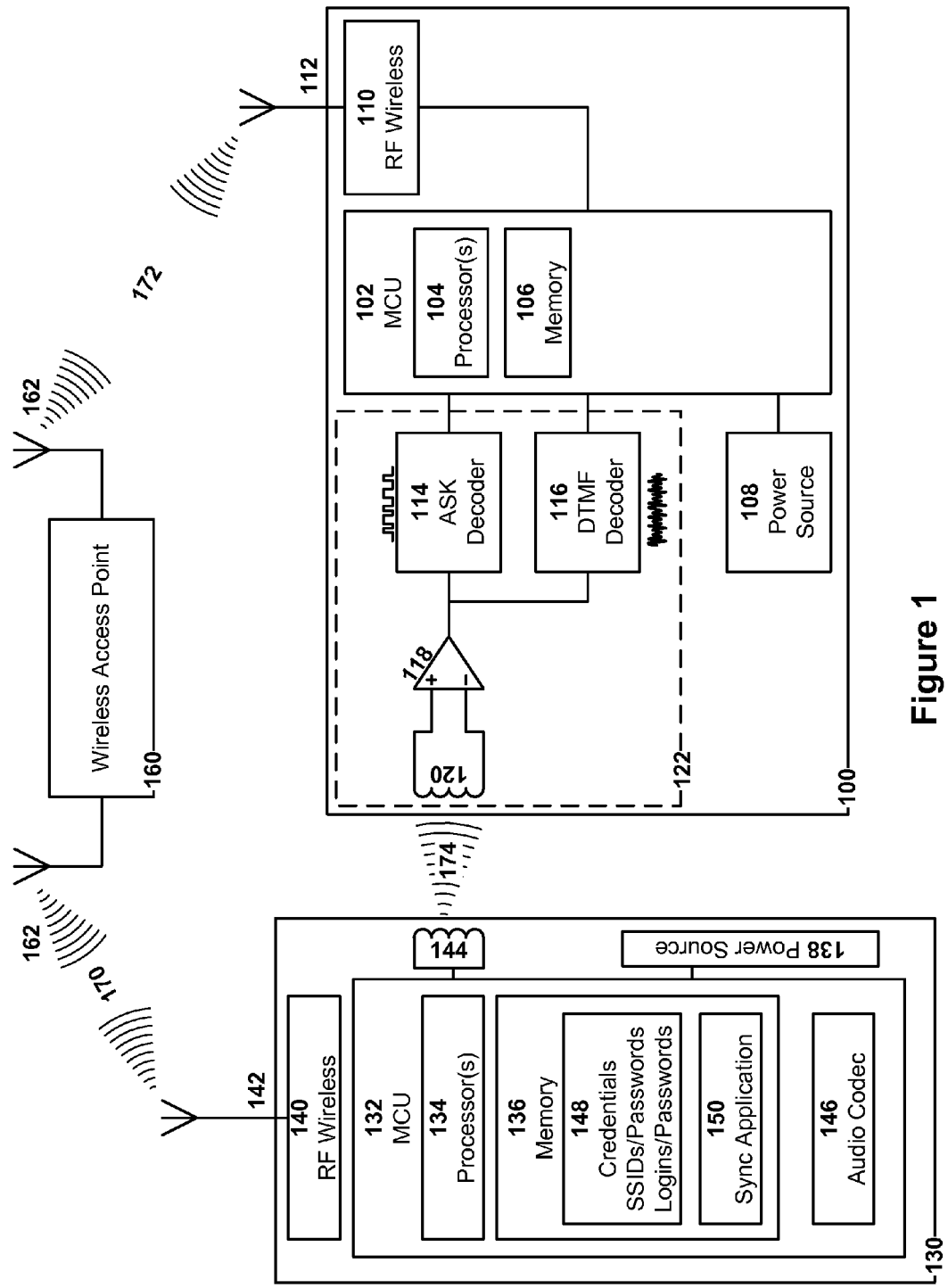
FIG. 1 depicts a schematic of various elements of a system configured to provide secure pairing via an inductive pickup coil.

Discussed below are systems and techniques that allow a client device to easily be connected or paired with a remote device using an intermediary mobile device by utilizing a hearing-aid-compatible (HAC) transmission device in the mobile device and an inductive pickup coil located in the client device. FIG. 1 depicts a schematic of various elements of a system configured to provide secure pairing via an inductive pickup coil.

FIG. 1 depicts a system that includes a client device 100, a mobile device 130, and a remote device 160. The client device 100 may include a client microcontroller unit (MCU) 102 that may include one or more client processors 104 and a client memory 106 that may be communicatively connected with one another. The client MCU 102 may be communicatively connected with a client radio-frequency (RF) wireless module 110 that may be configured to emit and/or receive wireless signals via a client wireless antenna 112. A client power source 108, e.g., a battery or wall-power connection, may provide power to the client MCU 102 and other client device 100 subsystems.

It is to be understood that, as used herein, "RF" refers to radio frequencies at or above the low-frequency domain of 30 kHz to 300 kHz. "RF", as used herein, is be understood as not referring to radio frequency domains below 30 kHz.

The items discussed above with respect to client device 100 may be generally included in any client device 100, regardless of how the client device 100 may be connected to a remote device 160. However, the client device 100 may also have a HAC pairing module 122 that is specific to the implementations discussed herein.

HAC pairing module 122 may include an inductive pickup coil 120 that is communicatively connected with a differential amplifier 118 and that is HAC. The differential amplifier may amplify magnetic signals received by the inductive pickup coil 120 and may route them to the client MCU 102. In the depicted illustrations, two separate paths are shown that allow the magnetic signals from the inductive pickup coil 120 to be routed to the client MCU 102—a path featuring an amplitude-shift keying (ASK) decoder 114 and another path featuring a dual-tone multi-frequency (DTMF) decoder 116. In actual practice, the client device 100 may, in some implementations, only include one path between the inductive pickup coil 120 and the client MCU 102. As may be readily understood, the exact technology used to decode a signal received by the inductive pickup coil 120 may be selected from a number of potential existing technologies, e.g., ASK, DTMF, phase-shift keying (PSK), frequency-shift keying (FSK), or other technologies or techniques. Moreover, while FIG. 1 depicts the ASK decoder 114 and the DTMF decoder 116 as being separate from the client MCU 102, such components, as well as potentially other components such as the differential amplifier 118, may be integrated into the client MCU 102 or may have their functionality provided by the client MCU 102. For example, the client MCU 102 may include a processor or circuit configured to provide analog-to-digital conversion and may also be configured to decode signals encoded using DTMF. The HAC pairing module 122 represents components and/or functionality that may be added to a client device 100 to facilitate secure pairing via the inductive pickup coil 120 that, absent such capability, would otherwise have no function in most client devices 100.

The decoding by the client device 100 of the signal that is received by the client device 100 via the inductive pickup coil 120 may also, in some implementations, include decryption operations that may utilize an decryption algorithm and decryption key stored on or otherwise accessible to the client device in order to decrypt the signal that is received by the client device 100 via the inductive pickup coil 120.

The client device 100 may represent any of a number of client devices 100, including Internet of Things (IoT) devices. Such client devices 100 may include smart appliances (e.g., refrigerators, washing machines, dryers, etc.), smart tags (e.g., pet ID tags, keyfob RF tags, etc.), environmental monitors (e.g., thermostats, rain sensors, motion detectors, window/door sensors, garage door sensors, etc.), etc.

The mobile device 130 HH30 may include a mobile MCU 132 that has one or more mobile processors 134 communicatively connected with a mobile memory 136. The mobile MCU 132 may be powered by a mobile power source 138 and may be connected to a mobile RF wireless module 140 that communicates wirelessly with other devices via mobile RF antenna 142. The mobile device 130 may also include a HAC transmission device 144.

HAC technology was initially developed as a means of providing hearing aids with a means of receiving an input signal that was an alternative to the acoustic signal picked up by a hearing aid's microphones. A hearing aid that complies with HAC standards has the ability to receive low-frequency (non-RF) magnetic signals via an inductive coil called a telecoil. A telecoil typically consists of a large number of turns of a thin, fine wire around a metal core or rod, i.e., an inductive pickup coil. Telecoils may be configured to be most inductively responsive to electromagnetic signals in the audio frequency ranges typically used in telephonic communications, e.g., several Hz to 3400 Hz or 5000 Hz. The term "telecoil" is typically used to refer to an inductive pickup coil that is particularly small in size, i.e., that is sized to fit within a hearing aid (some telecoils are approximately 1.5 mm in diameter and 5 mm in length). In the context of the client device 100, the inductive pickup coil 120 may be a telecoil, i.e., small enough in size so as to fit within a hearing aid, or a larger inductive pickup coil (many client devices 100 may not require the small sizes required of hearing aids and may thus utilize inductive pickup coils that are not bound by the size constraints of hearing aids; such inductive pickup coils may add less cost to the client device 100). Regardless of whether the inductive pickup coil 120 is a telecoil or not, the inductive pickup coil 120 is configured to receive HAC magnetic signals emitted from a nearby HAC transmission device.

When the HAC standards were initially developed in the mid-twentieth century, telephones utilized permanent magnet speakers in their receivers. Such speakers frequently exhibited electromagnetic leakage of the signal that was used by such telephones to actuate the permanent magnet speakers. Hearing aids with telecoils in them would, when such a telephone receiver was held up to the hearing aid wearer's ear (assuming the ear had a hearing aid), inductively couple with the magnetic portion of the leaking electromagnetic audio signal. If the hearing aid was switched to receive its input from the telecoil instead of the hearing aid microphones, the inductively-coupled magnetic signal portion would be fed through the hearing aid circuits and then output via the hearing aid output speakers. Due to the technologies in use at the time that the HAC standards were initially established, the magnetic signals in question had frequencies in the human audio frequency range, e.g., on the order of hertz to several kilohertz. Conventional telephone systems at the time that the HAC standards were established operated in the 300 Hz to 3.4 kHz range. The HAC standards were initially set such that most telephones were inherently compliant due to the technologies used in telephone receivers at the time.

As technology progressed, however, telephone manufacturers decreased the amount of electromagnetic leakage in telephone receivers, and the HAC capabilities of such improved telephones decreased. For example, many low-power piezoelectric speakers do not produce a magnetic signal that is sufficiently strong enough to be detectable by a hearing aid telecoil. In order to still comply with the HAC standards, such a telephone may utilize a separate HAC transmitter, e.g., another telecoil, rather than rely on the magnetic signals that are emitted from the telephone speaker during normal use. Many modern cell phones and smartphones utilize telecoils or other HAC transmission devices that receive magnetic audio signals, via magnetic inductive coupling, from the telephone audio processing circuits in parallel with the electrical audio signals used to drive the acoustic speakers of the cell phones or smart phones (or, in some cases, via a separate, switchable alternative circuit). In some cases, the HAC transmission devices may be switchable, e.g., the user may turn on or off a HAC mode on the mobile device 130 in order to enable or disable the HAC transmission device from receiving electrical audio signals.

Due to various legislative acts, HAC is standard on virtually all non-wireless telephones sold in the United States, and on an increasing number of wireless telephones sold in the United States. Standards similar to HAC may be utilized in other countries as well, and the references herein to HAC are to be understood to apply to similar hearing-aid-compatibility standards using inductive pickup coils in other countries as well. As a result of such legislative acts and out of a desire to appeal to the large segment of the population that utilizes hearing aids (~10%), mobile device 130 manufacturers increasingly include HAC functionality in their mobile devices, e.g., smartphones and cell phones. HAC functionality is thus already very widespread, allowing a large number of already-existing mobile devices to be used in implementing the concepts and techniques described herein with no additional hardware required in the mobile devices.

Also depicted in FIG. 1 is a remote device 160, e.g., a wireless access point, to which it may be desired to connect the client device 100. The remote device 160 may include remote RF antenna(s) 162 that may be used by the remote device 160 to establish a wireless connection between the remote device 160 and the client device 100. For example, a wireless mobile device 130/remote device 160 connection 170 may be established between the mobile device 130 and the remote device 160 and a wireless client device 100/remote device 160 connection 172 may be established between the client device 100 and the remote device 160. In addition to the wireless mobile device 130/remote device 160 connection 170 and the wireless client device 100/remote device 160 connection 172 that may be formed, the mobile device 130 may form a unidirectional mobile device 130/client device 100 HAC connection with the client device 100 via inductive coupling between the HAC transmission device 144 and the inductive pickup coil 120. The remote device 160 is not limited to the wireless access point depicted, and may include any number of different types of remote devices, including wireless routers, network storage servers, web servers, and even other client devices.

Figure 2:
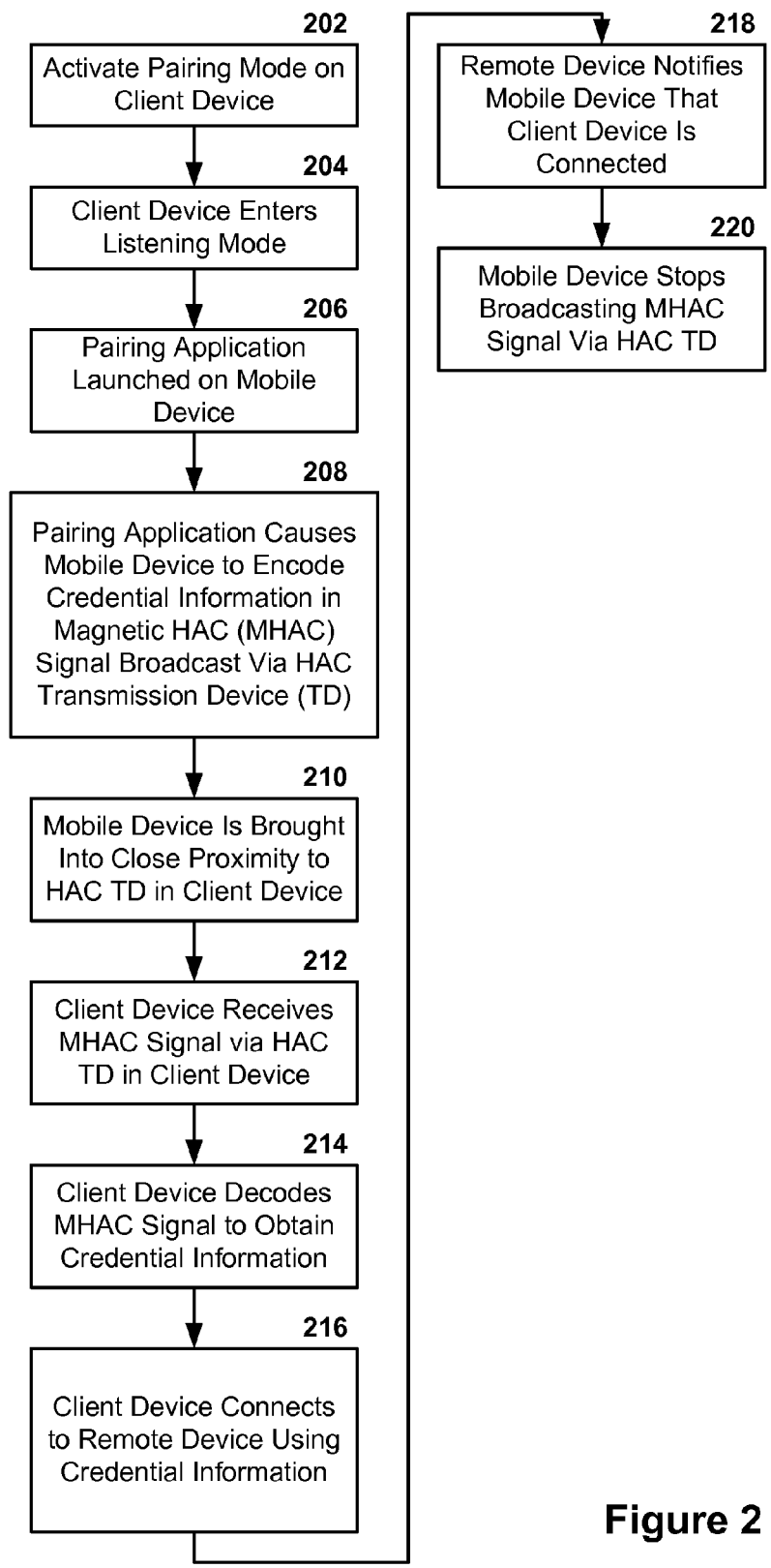
FIG. 2 depicts a flow chart of a technique securely pairing two devices using an inductive pickup coil.

While FIG. 1 describes various hardware aspects of a system for secure pairing using a inductive pickup coil, FIG. 2 depicts a flow chart of a technique securely pairing two devices using a inductive pickup coil.

Before a client device 100 may be used to connect to a remote device 160, it may be necessary to provide the client device 100 with the proper credentials that allow such a connection to be made. For example, a remote device 160 may require that a client device 100 provide a proper password before granting access to the client device 100. In another example, the remote device 160 may be a remote web server and may require that the client device 100 supply a user account identification as well as a password. In some cases, multiple levels of authorization may be required and/or multiple remote devices 160 may need to be accessed, e.g., a client device 100 may first need to connect with a wireless router to form a TCP/IP connection to the Internet, and may then need to connect with a remote web server to access a user's account information. In such cases, there may be multiple sets of credentials that may need to be provided to the client device 100 to allow the client device 100 to form the desired connections.

Once the client device 100 has such credentials, the credentials may be stored locally and retrieved for later use. However, the initial provisioning of the client device 100 with the credentials may be time consuming. The technique diagrammed in FIG. 2 allows for the transfer of such credentials from a mobile device 130 to a client device 100 in a rapid and secure manner.

In block 202, the client device 100 may be placed in a "pairing mode." The client device 100 may be placed in pairing mode by, for example, pressing a button on the client device 100, rebooting the client device 100, or otherwise indicating that the client device 100 is to enter pairing mode. During pairing mode, the client device 100 may enter a "listening mode" where the client device 100 is receptive to magnetic signals that are received by the inductive pickup coil 120 via inductive coupling. For example, during listening mode, power may be supplied to the differential amplifier 118, the ASK decoder 114 or the DTMF decoder 116, and/or other components or systems involved with receiving and decoding a magnetic signal that is inductively coupled into the inductive pickup coil 120. When the client device is not in pairing mode, it may not monitor the inductive pickup coil 120 for inductively-coupled magnetic signals.

While or before the client device 100 is placed in pairing mode, a pairing application 150 stored in the mobile memory 136 may be launched on the mobile device 130 in block 206 and a "registration mode" activated (the pairing application 150 may automatically engage in such a mode when launched in some implementations). The pairing application 150 may include computer-executable instructions that, in registration mode, cause the mobile processor(s) to obtain credential information from credential storage 148 and to encode the obtained credential information using an audio codec 146 in block 208. Once encoded as a magnetic audio-frequency spectrum signal, the credential information may be broadcast via the HAC transmission device 144 as a magnetic HAC (MHAC) signal.

The pairing application 150 may also include computer-executable instructions that cause the mobile processor(s) (or whichever processors in the mobile device perform encoding functions) to encrypt the credential information at some point before the credential information is broadcast via the HAC transmission device 144.

The pairing application 150 may be configured to obtain the credential information through any of a number of different mechanisms. For example, the pairing application 150 may allow a user to manually input credential information into the pairing application 150 for later reference. In some implementations, the pairing application 150 may retrieve such credential information from a repository located on the mobile device 130, e.g., the mobile device 130's own store of credentials used by the mobile device 130 to access various remote devices 160. In yet further implementations, the pairing application may obtain credential information from a remote device, e.g., from a web server providing "password vault" services.

The pairing application 150 may be pre-installed on the mobile device 130, or may be separately installed on the mobile device 130. For example, the pairing application 150 may be downloaded to the mobile device 130 by a user via an Internet connection.

In block 210, the mobile device 130 may be brought into close proximity, e.g., less than an inch to a few inches, to the inductive pickup coil 120 in the client device 100 (or vice versa). The effective HAC range of mobile devices is typically on the order of inches due to the power constraints of mobile devices and because mobile devices with HAC are typically held in close proximity to a hearing aid wearer's ear, and thus the hearing aid, when used to make telephone calls. Moreover, HAC mobile devices may be equipped with HAC transmission devices designed to ensure that magnetic signals in the audio spectrum, e.g., in the hundreds of Hz to thousands or low ten-thousands of Hz, are readily detectable by telecoils typically used in hearing aids (and thus, by extension, inductive pickup coils such as inductive pickup coil 120).

In block 212, the client device 100 may receive the MHAC signal via the inductive pickup coil 120 and then, in block 214, process the received MHAC signal using, for example, the differential amplifier 118 and ASK decoder 114, DTMF decoder 116, or other decoding mechanism. Computer executable instructions stored in the client memory 106 may include instructions for controlling the client processor(s) 104 to receive data from the decoded MHAC signal and, in some implementations, assist in the decoding or even perform the decoding of the MHAC signal. The client device 100 may then obtain the credential information from the decoded MHAC signal.

In block 216, the client device 100 may utilize some or all of the credential information to connect to the remote device 160 via the client RF wireless module 110. For example, the client device 100 may obtain credential information indicating a wireless service set identification (SSID) and an associated password. The client device 100 may then attempt to establish a communications connection with the remote device 160 using the SSID and the password.

In some implementations, the technique may terminate after the performance of block 216. In other implementations, however, the technique may continue to block 218, where the remote device 160 may notify the mobile device 130 that the client device 100 has established a connection. For example, the remote device 160 may communicate with the mobile device 130 directly, e.g., via the RF mobile device 130/remote device 160 connection, or via some alternate communications mechanism, e.g., by sending a message to another remote device 160, e.g., a web server, that relays the message to the mobile device 130.

In block 220, the mobile device 130 may stop transmitting the MHAC signal via the HAC transmitter device 144.

The technique outlined in FIG. 2 and discussed above provides a secure means of pairing or connecting the client device 100 to the remote device 160. Such security is provided, at least in part, by a combination of various factors. For example, credential information is provided from the mobile device 130 to the client device 100 using an MHAC signal, which is an out-of-band communications channel with respect to the communications channels that are commonly used to support digital communications. Due to practical considerations, wireless networking and other wireless digital communications protocols commonly utilize communications channels in the RF spectrum, e.g., in the high MHz range to low GHz range (lower frequency ranges are unable to provide the throughput required for most modern digital communications). Thus, several orders of magnitude separate the Hz/kHz HAC communications band from the MHz/GHz wireless RF communications band. Additionally, the HAC communications band as used by mobile devices, as mentioned above, typically has an effective range that is on the order of several inches, whereas wireless digital communications protocols typically have ranges on the order of tens of meters, e.g., 20 to 70 meters indoors and 100 to 250 meters outdoors. Thus, the HAC communications band utilized to communicate credential information as discussed herein is a communications band that is, for all practical purposes, isolated in range and frequency from the wireless RF communications bands utilized by the client device 100 and the remote device 160 for digital communications. This makes it virtually impossible for a third party without access to the client device 100 to eavesdrop on the communication of credential information from the mobile device 130 to the client device 100 via the HAC transmission device 144 and the inductive pickup coil 120. Moreover, due to the fact that the credential information may only be transmitted from the mobile device 130 in response to the deliberate execution of the pairing application 150 on the mobile device 130 by a user, it is not possible to "brute force" attack the credential source. For example, WiFi Protected Setup (WPS), which is a protocol that facilitates wireless connection formation between a client device 100 and a remote device 160, has a known vulnerability that allows a third party to obtain access to the remote device 160 by repeatedly trying different 7-digit access codes—the acknowledgement signals provided by the remote device 160 in response to each such attempt provide insight as to the correct access code to use (due to the manner in which WPS was designed, it is possible to brute force a connection to a WPS system in less than 11,000 attempts, even though a 7-digit access code is used). Such attacks will not work with at least some implementations of the system of FIG. 1 and the technique of FIG. 2 since the mobile device 130 may only provide information regarding the credentials when explicitly instructed to do so by a local user (as opposed to allowing a third party to independently attempt to obtain the credentials by querying the remote device 160).

It is to be understood that while the above discussion has focused on facilitating wireless RF connections between the client device 100 and the remote device 160, the above techniques and systems may be used to convey credential information usable with any of a variety of different remote devices 160. For example, the technique of FIG. 2 may also be used to connect a client device 100 with a remote device 160 through an entirely wired connection, e.g., the client device 100 may not require any credentials to connect to an Internet-connected router since it is connected to the router via an Ethernet cable, but the client device 100 may require credential information in order to access a website provided by a remote device 160 over the Internet. For example, if the client device 100 is a media player of some sort, it may be capable of streaming multimedia content from a multimedia Internet server if it provides the proper credential information to the multimedia Internet server. Thus, it is to be understood that in addition to facilitating connecting client devices 100 to remote devices 160 via wireless communications protocols, the techniques and systems described herein may also be more generally applicable to any system in which it is desirable to supply credential information that may be stored on a mobile device 130 to a client device 100 for later use by the client device 100.

While in the discussions above, the communications between the client device 100 and the remote device 160 have occurred across wireless communications interfaces, e.g., across 802.11-compliant network connections, it is to be understood that either or both type of communication may also occur using wired communications interfaces, and that the mobile device 130, the client device 100, and the remote device 160 may have physical communications interfaces that support the particular type of communications connection that is to be used.

In some implementations, the HAC transmission of credential information may be of a limited duration, e.g., may time out, to prevent inadvertent extended broadcast of the credential information (regardless of the limited transmission range that the HAC transmission device 144 in the mobile device 130 may afford).

In some implementations, the credential information supplied by the mobile device 130 to the client device 100 may have a limited lifespan. In such cases, the client device 100 may utilize the credential information to obtain initial access to the remote device 160 and the remote device 160, or the client device 100 via the remote device 160, may send an indication to the mobile device 130 that the client device 100 has successfully accessed the remote device 160. In some implementations, the pairing application 150 may be further configured to allow a user to indicate whether the client device 100 should be allowed to have continued access to the remote device 160. For example, the pairing application 150 may identify a particular client device 100 to the user and indicate that the identified client device 100 has recently provided credentials to the remote device 160 and been granted access (or perhaps limited access) to the remote device 160. The pairing application 150 may accept an input from the user indicating whether or not the client device 100 is to be granted continued access to the remote device 160. The pairing application 150 may then cause the remote device 160 to issue longer-lived credentials to the client device 100 (or cause the lifespan of the in-use credentials to increase), issue such longer-lived credentials directly, or otherwise cause such longer-term access to be supplied. The additional credentials, if needed, may be sent to the client device 100 via the HAC transmission device 144, although in many implementations, the client device 100 may obtain such additional credentials via the credentialed connection with the remote device 160 once the client device 100 secures the initial credentialed connection to the remove device 160 (since such a credentialed connection is generally secure once established). In some such implementations, the remote device 160 may be configured to supply the mobile device 130 with such "temporary" credentials to pass on to the remote device 160.

In some implementations, the pairing application 150 on the mobile device 130 may be configured to issue temporary credentials to a client device 100 and to notify the remote device 160 that such temporary credentials have been issued. For example, the remote device 160 may be a webserver on which a user has an account, and the mobile device 130, by virtue the credentials that it stores in the mobile memory 136, may have permissions to issue temporary credentials to a client device 100 in association with that user account. The pairing application 150 may inform the remote device 160 that temporary credentials have been provided to the client device 100 in association with that user account, and the remote device 160 may be configured to grant access to the client device 100 for a fixed period of time in response to the client device 100 providing the remote device 160 with the temporary credentials associated with that user account. During this fixed period of time, the remote device 160 may indicate to the mobile device 130 that the client device 100 has successfully connected to the remote device 160 using the temporary credentials associated with that user account; such an indication may include information that identifies the client device 100, e.g., a model number, serial number, or other identifier. If the mobile device 130 sends a message back to the remote device 160 confirming that the indicated client device 100 is authorized to connect with the remote device 160, then the remote device 160 may issue more permanent credentials to the client device 100 or, alternatively, increase or suspend the fixed period of time. The mobile device 130 may, for example, indicate to a user information identifying the client device 100 and the remote device 160 to which the client device 100 has connected and may then prompt the user to confirm whether or not such a connection is actually authorized. The user's confirmation (or lack thereof) may be communicated back to the remote device 160 and may determine whether or not the client device 100 is to retain access privileges to the remote device 160.

In some implementations, the client device 100 may be hermetically sealed, i.e., with no ingress points for moisture or other contaminants. Such implementations may utilize wireless communications exclusively, and may thus require no penetrations through their outer housings for such purposes. Additionally, such implementations may utilize a rechargeable battery that may be recharged using an inductive charging system, thus avoiding the need for power-related penetrations in the outer housing of the client device 100.

In some implementations, the inductive pickup coil may form all or part of an inductive charging system of the client device 100 or the mobile device 130. In other words, the inductive pickup coil may be configured to receive an inductive charging signal in addition to an MHAC signal.

In some implementations, the system may also include an inductive charging station for either the client device 100 or the mobile device 130. The inductive charging station may, in effect, act as a relay for credentials from the mobile device 130 to the client device 100. For example, in some implementations, the inductive charging station may initially "act" as a client device and receive, via an inductive pickup coil in the inductive charging station (which may also act as the inductive charging coil for charging purposes) an MHAC signal from the mobile device 130 as discussed above. The inductive charging station may connect to a remote device using the credentials. However, the inductive charging station may also, or alternatively, store the credentials and then "act" as a mobile device with respect to another client device. For example, the inductive charging station may include a processor or processors and a memory that may store a charger pairing application similar, in at least some respects, to the pairing application on the mobile device 130, as well as any received credentials. The charger pairing application may include computer-executable instructions for controlling the processor(s) of the inductive charging station to encode the credentials in a manner such as that described above with respect to the mobile device 130 and to then transmit the encoded credentials as an MHAC signal via the inductive pickup coil (or similar but separate device) of the inductive charging station. Such encoding and transmission may occur continuously in some implementations. In other implementations, the encoding and transmission may occur in response to a trigger event, e.g., a button being pressed on the inductive charging station. In some implementations, the trigger event may occur when the inductive charging station detects that an external device is being inductively charged by the inductive charging station, i.e., the inductive charging station may automatically transmit MHAC signals with encoded credential information whenever an external device is being charged using the inductive charging station. In some implementations, the inductive charging station may also include a display screen and a user interface that allows a user to interact with the charger pairing application on the inductive charging station in much the same manner as the user may interact with the pairing application 150 on the mobile device. In such implementations, the user may trigger encoding and MHAC transmission of the credential information by interacting with the charger pairing application via the interface.

In the above-described implementation, the inductive charging station may act as a relay or buffer for credential information that is stored in a mobile device. The inductive charging station, in this example, may thus function as both a client device (when it obtains the credential information from the mobile device 130) and as a mobile device (when it provides the obtained credential information to another client device 100). In some such implementations, other mobile devices may also act as client devices when placed near the inductive charging station. For example, if a person has such an inductive charging station in their home and communicates credential information for the person's home WiFi network to the inductive charging station from a mobile device such as a smartphone, guests in the person's home may be provided with that credential information by placing their devices, e.g., their own smartphones, laptops, tablets, etc., near the inductive charging station—the guests' devices may thus act as client devices in this example (assuming that the guests' devices have the ability to receive an MHAC signal).

Inductive pickup coils 120 that may be used in the client device 100 may be selected from a variety of HAC inductive pickup coils. In one example, the inductive pickup coil 120 may have approximately 500 turns of 42 American Wire Gauge (AWG) wire and be capable of operating potentials in the range of 1 mV.

It is to be understood that the various functional aspects of the systems described above may be provided using a number of different components and arrangements of components. For example, the client device 100 MCU 102 may include a client processor 104 that executes computer-executable instructions stored on the client memory 106 to cause the client device 100 to enter into pairing mode, to cause a received MHAC signal to be decoded, and to then supply the remote device 160 with credential information extracted from the decoded MHAC signal. In some implementations, however, some or all of this functionality may be provided by an application-specific integrated circuit (ASIC) or through some other computational mechanism. It is to be understood that regardless of the particular specific components used to implement the techniques for secure pairing via inductive pickup coil discussed herein, such alternative implementations are also considered to be within the scope of this disclosure.

Any of the components or operations described herein may be implemented as software code to be executed by a processor using any suitable computer language such as Java, C++, Python, Perl, by way of example only. The software code may be stored as a series of instructions or commands on a computer-readable medium for storage and/or transmission. Suitable computer-readable media include random access-memory (RAM), read-only memory (ROM), a magnetic medium such as a hard-drive or a floppy disk, an optical medium such as a compact disk (CD) or DVD (digital versatile disk), flash memory, and the like. In many implementations, the pairing application 150 may be a downloadable "app" that may be installed in the mobile device 130 after being downloaded from a central server. The computer-readable medium may be any combination of such storage or transmission devices. Computer-readable media encoded with the software/program code may be packaged with a compatible device such as a client device 100, mobile device 130, or remote device 160 as described above or provided separately from such devices.

Examples of various implementations have been illustrated in the accompanying drawings and described further in the text above. It will be understood that the discussion herein is not intended to limit the claims to the specific implementations described. On the contrary, it is intended to cover alternatives, modifications, and equivalents as may be included within the spirit and scope of the invention as defined by the appended claims. In the preceding description, numerous implementation-specific details have been set forth in order to provide a thorough understanding of the present invention. The present invention may be practiced without some or all of these implementation-specific details. In other instances, well-known process operations have not been described in detail in order not to unnecessarily obscure the present invention. For example, in addition to the implementations described above and claimed below, this disclosure is also directed to, but not limited to, the following implementations.

In some implementations, a non-transitory, computer-readable medium storing computer-executable instructions for controlling one or more processors of a hearing-aid-compatible (HAC) mobile device to facilitate pairing of a client device with a remote device may be provided. The client device, the remote device, and the HAC mobile device may be separate devices. The computer-executable instructions may include instructions for causing the one or more processors of the mobile device to: retrieve a set of credentials from a memory of the HAC mobile device, the set of credentials including first credentials for gaining access to the remote device; encode the set of credentials in an magnetic HAC (MHAC) signal; and cause the HAC mobile device to transmit, during a first pairing time, the MHAC signal via a device in the HAC mobile device that is configured to emit MHAC signals.

In some such implementations, the computer-executable instructions may also include instructions for further controlling the one or more processors to: receive an indication from the remote device after the first pairing time has started, and via a communications interface, that the client device has established communications with the remote device, and terminate, after receiving the indication that the client device has established communications with the remote device, the transmission of the MHAC signal from the device configured to emit MHAC signals.

In some additional or alternative implementations, the set of credentials may be encoded using an encoding technique selected from the group consisting of dual-tone, multi-frequency (DTMF) encoding, amplitude-shift keying (ASK) encoding, frequency-shift keying (FSK), phase-shift keying (PSK), and combinations thereof.

In some additional or alternative implementations, the set of credentials may be encoded, at least in part, using an encryption technique. In some additional or alternative implementations, the first credentials may include a wireless network name and an authentication code associated with the wireless network name. In some additional or alternative implementations, the first credentials may include information such as a public key certificate and/or a hash. In some additional or alternative implementations, the first credentials may include a website logon name and an authentication code associated with the website logon name.

In some implementations, a method may be provided that includes: causing a client device to enter into a pairing mode; receiving an magnetic hearing-aid-compatible (HAC) signal via a HAC inductive pickup coil in the client device while the client device is in the pairing mode; decoding the magnetic HAC signal received via the HAC inductive pickup coil to obtain first credentials for accessing a remote device via a wireless LAN and/or wireless WAN communications interface; and causing the client device to establish communications with the remote device using the first credentials and via a wireless LAN and/or wireless WAN communications interface of the client device. In some such implementations, the client device may enter the pairing mode responsive to being turned on from an off state or responsive to receiving an input from an external source.

It is to be understood that in some other implementations, the computer-executable instructions may be uploaded to a mobile device from a central server (or downloaded from a central server to a mobile device), and that the act of transmitting such computer-executable instructions is also considered to be within the scope of this disclosure.

Any of the implementations described herein may be used alone or together with one another in any combination. Although various implementations may have been motivated by various deficiencies with the prior art, which may be discussed or alluded to in one or more places in the specification, the implementations do not necessarily address any of these deficiencies. In other words, different implementations may address different deficiencies that may be discussed in the specification. Some implementations may only partially address some deficiencies or just one deficiency that may be discussed in the specification, and some implementations may not address any of these deficiencies.

While various implementations have been described herein, it should be understood that they have been presented by way of example only, and not limitation. Thus, the breadth and scope of the present disclosure should not be limited by any of the implementations described herein, but should be defined only in accordance with the following and later-submitted claims and their equivalents.

It will be understood that unless features in any of the above-described implementations are expressly identified as incompatible with one another or the surrounding context implies that they are mutually exclusive and not readily combinable in a complementary and/or supportive sense, the totality of this disclosure contemplates and envisions that specific features of those implementations can be selectively combined to provide one or more comprehensive, but slightly different, technical solutions. It will therefore be further appreciated that the above description has been given by way of example only and that modifications in detail may be made within the scope of the disclosure.

What is claimed is:

1. A mobile device configured to transmit a set of temporary credentials to a client device, the mobile device comprising:
one or more processors;
a memory; and
a hearing-aid-compatible (HAC) transmission device configured to emit magnetic HAC (MHAC) signals, wherein:
the memory, the one or more processors, and the HAC transmission device are communicatively connected, and
the memory stores computer-executable instructions for controlling the one or more processors to:
receive an indication to initiate a transfer of the set of temporary credentials to the client device;
retrieve the set of temporary credentials from the memory, the set of temporary credentials including temporary credentials for gaining access to a remote device;
encode the set of temporary credentials using an encoding technique;
transmit an MHAC signal from the HAC transmission device, wherein the MHAC signal includes the encoded set of temporary credentials and is formatted to be received by the client device;

receive a communication from the remote device indicating that the client device has established communications with the remote device using the temporary credentials for gaining access to the remote device; and send, responsive to receiving the communication, a confirmation to the remote device that the client device is authorized to communicate with the remote device.

2. The mobile device of claim 1, further comprising:
a communications interface, wherein the memory stores further computer-executable instructions for controlling the one or more processors to
terminate, responsive to receiving the communication, the transmission of the MHAC signal from the HAC transmission device.

3. The mobile device of claim 1, wherein the encoding technique is selected from the group consisting of dual-tone, multi-frequency (DTMF) encoding; amplitude-shift keying (ASK) encoding; frequency-shift keying (FSK); and phase-shift keying (PSK).

4. The mobile device of claim 1, wherein the set of temporary credentials are encoded, at least in part, using an encryption technique.

5. The mobile device of claim 1, wherein the set of temporary credentials includes a wireless network name and an authentication code associated with the wireless network name.

6. The mobile device of claim 1, wherein the set of temporary credentials includes information selected from the group consisting of a public key certificate and a hash.

7. The mobile device of claim 1, wherein the set of temporary credentials includes a website logon name and an authentication code associated with the website logon name.

8. The mobile device of claim 1, wherein:
the indication is received via user interaction with the mobile device, and
the MHAC signal is transmitted from the HAC transmission device responsive, at least in part, to receipt of the indication.

9. A non-transitory, computer-readable medium storing computer-executable instructions for controlling one or more processors of a mobile device to:
receive an indication of a user interaction with an application user interface of the mobile device;
retrieve temporary credentials for gaining access to a remote device from a memory of the mobile device;
encode the temporary credentials using an encoding technique;
transmit, responsive to receiving the indication of the user interaction, the encoded temporary credentials to a client device using a magnetic hearing-aid-compatible (MHAC) signal;
receive a communication from the remote device indicating that the client device has established communications with the remote device using the temporary credentials; and
send, responsive to receiving the communication, a confirmation to the remote device that the client device is authorized to communicate with the remote device.

10. The non-transitory, computer-readable medium of claim 9, wherein the temporary credentials facilitate a connection to a remote device and the computer-executable instructions include further computer-executable instructions for controlling the one or more processors of the mobile device to:

receive an indication from the remote device that the client device has established the connection with the remote device, and
terminate, after receiving the indication that the client device has established the connection with the remote device, the transmission of the MHAC signal.

11. The non-transitory, computer-readable medium of claim 9, wherein the temporary credentials are encoded, at least in part, using an encryption technique.

12. The non-transitory, computer-readable medium of claim 9, wherein the encoding technique is selected from the group consisting of dual-tone, multi-frequency (DTMF) encoding; amplitude-shift keying (ASK) encoding; frequency-shift keying (FSK); and phase-shift keying (PSK).

13. The non-transitory, computer-readable medium of claim 9, wherein the temporary credentials include a wireless network name and an authentication code associated with the wireless network name.

14. The non-transitory, computer-readable medium of claim 9, wherein the temporary credentials include information selected from the group consisting of a public key certificate and a hash.

15. The non-transitory, computer-readable medium of claim 9, wherein the temporary credentials include a website logon name and an authentication code associated with the web site logon name.

16. A client device comprising:
a controller having one or more processors and a memory;
a communications interface; and
an inductive pickup coil configured to receive magnetic signals, wherein:
the one or more processors, the memory, the communications interface, and the inductive pickup coil are communicatively connected, and
the client device is configured to:
establish a communications connection utilizing a magnetic hearing-aid-compatible (MHAC) signal with a mobile device via the inductive pickup coil,
receive encoded credentials from the mobile device via the MHAC signal, wherein the encoded credentials include credentials for gaining access to a remote device,
decode the encoded credentials encoded in the MHAC signal to generate decoded credentials, and
utilize the decoded credentials to obtain access to the remote device via the communications interface.

17. The client device of claim 16, wherein the client device is further configured to decode the MHAC signal at least in part by utilizing a decryption algorithm.

18. The client device of claim 16, wherein the client device is further configured to obtain access to the remote device via, at least in part, a wireless network connection established through the communications interface and by using the decoded credentials to gain access to the remote device via the wireless network connection.

19. The client device of claim 16, wherein the decoded credentials include a wireless network name and an authentication code associated with the wireless network name.

20. The client device of claim 16, wherein the decoded credentials include information selected from the group consisting of a public key certificate and a hash.

21. The client device of claim 16, wherein the decoded credentials include a website logon name and an authentication code associated with the website logon name.

* * * * *